United States Patent
Sohn (10) Patent No.: US 9,564,666 B2
(45) Date of Patent: Feb. 7, 2017

(54) BATTERY PACK (75) Inventor: Kwon Sohn, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 1212 days.

(21) Appl. No.: 13/206,450

(22) Filed: Aug. 9, 2011

(65) Prior Publication Data

US 2012/0231316 A1    Sep. 13, 2012

(30) Foreign Application Priority Data

Mar. 8, 2011   (KR) .................. 10-2011-0020447

(51) Int. Cl.
*H01M 10/6556* (2014.01)
*H01M 10/613* (2014.01)

(52) U.S. Cl.
CPC ....... *H01M 10/613* (2015.04); *H01M 10/6556* (2015.04)

(58) Field of Classification Search
CPC ............ H01M 10/655; H01M 10/6551; H01M 10/6556; H01M 10/6557
USPC ......................................................... 429/120
See application file for complete search history.

(56) References Cited

U.S. PATENT DOCUMENTS

| | | | | |
|---|---|---|---|---|
| 3,396,992 A | * | 8/1968 | Hale | 285/100 |
| 4,585,712 A | * | 4/1986 | Wedlake | 429/50 |
| 4,738,906 A | * | 4/1988 | Sanders | 429/120 |
| 6,013,388 A | * | 1/2000 | Stadnick et al. | 429/120 |
| 7,846,573 B2 | * | 12/2010 | Kelly | 429/120 |
| 2006/0204840 A1 | | 9/2006 | Jeon et al. | |
| 2008/0090137 A1 | * | 4/2008 | Buck et al. | 429/120 |
| 2008/0182156 A1 | * | 7/2008 | Atkinson et al. | 429/50 |
| 2009/0087727 A1 | * | 4/2009 | Harada et al. | 429/120 |
| 2009/0142653 A1 | | 6/2009 | Okada et al. | |
| 2009/0255109 A1 | * | 10/2009 | Weber | H01M 2/14 29/623.2 |
| 2010/0279154 A1 | * | 11/2010 | Koetting et al. | 429/50 |

FOREIGN PATENT DOCUMENTS

| | | |
|---|---|---|
| JP | 11-307139 A | 11/1999 |
| JP | 2004-047426 A | 2/2004 |
| JP | 2009-134901 A | 6/2009 |

(Continued)

OTHER PUBLICATIONS

KIPO Office action dated Sep. 11, 2012 in priority KR application No. 10-2011-0020447 (4 pages).

(Continued)

*Primary Examiner* — Maria J Laios
(74) *Attorney, Agent, or Firm* — Lewis Roca Rothgerber Christie LLP (57) ABSTRACT

A battery pack having improved heat dissipation characteristics. A battery pack includes a plurality of battery modules, each including a plurality of battery cells aligned in a direction, and a plurality of barriers, each being between a respective pair of adjacent battery cells of the plurality of battery cells and including a connection portion protruded to the outside of the adjacent battery cells. The battery pack further includes a heat dissipation member connected to connection portions of the plurality of connection portions, and a heat conducting member connected to the heat dissipation member.

17 Claims, 7 Drawing Sheets

(56) References Cited

FOREIGN PATENT DOCUMENTS

| | | |
|---|---|---|
| JP | 2009-261125 A | 11/2009 |
| KR | 2006-099216 A | 9/2006 |
| KR | 2008-0023401 A | 3/2008 |
| KR | 2008-0054283 A | 6/2008 |
| KR | 10-1112753 B1 | 3/2012 |

OTHER PUBLICATIONS

KIPO Notice of Allowance dated Mar. 11, 2013 issued in priority Application No. KR 10-2011-0020447 (1 sheet).

* cited by examiner

BATTERY PACK

CROSS-REFERENCE TO RELATED APPLICATION

This application claims priority to and the benefit of Korean Patent Application No. 10-2011-0020447, filed on Mar. 8, 2011 in the Korean Intellectual Property Office, the entire content of which is incorporated herein by reference.

BACKGROUND

1. Field

Aspects of embodiments of the present invention relate to a battery pack, and more particularly, to a battery pack having improved heat dissipation.

2. Description of the Related Art

In general, secondary batteries are rechargeable and can be repeatedly used. The secondary batteries may be implemented as a battery cell used for portable small-sized electronic devices such as a cellular phone, a desktop computer, a laptop computer, a camera, and a camcorder. Alternatively, the secondary batteries may be implemented as a battery pack including a plurality of battery cells, used as a power source for driving motors of a high-power hybrid electric vehicle (HEV), an electric vehicle (EV), and the like.

The battery pack used as a power source for driving high-power motors generates a large amount of heat due to a charge or discharge operation, and the generated heat may deteriorate the battery cells. Therefore, it is required to develop a battery pack with a structure having improved heat dissipation characteristics.

SUMMARY

According to an aspect of embodiments of the present invention, a battery pack has improved heat dissipation characteristics.

According to another aspect of embodiments of the present invention, a battery pack is configured to achieve convection mode cooling using a heat dissipation pipe and a porous member.

According to another aspect of embodiments of the present invention, a battery pack is configured to achieve conduction mode cooling using a heat dissipation pipe and a porous member.

According to an embodiment of the present invention, a battery pack includes: a plurality of battery modules, each including a plurality of battery cells aligned in a direction, and a plurality of barriers, each being between a respective pair of adjacent battery cells of the plurality of battery cells and including a connection portion protruded to the outside of the adjacent battery cells. The battery pack further includes a heat dissipation member connected to connection portions of the plurality of connection portions, and a heat conducting member connected to the heat dissipation member.

The battery pack may further include a housing accommodating the plurality of battery modules and the heat dissipation member.

The heat conducting member may be outside of the housing.

The heat conducting member may be inside of the housing.

The battery pack may further include a fastening member connected to the heat conducting member.

The heat dissipation member and the heat conducting member may be connected to each other via the fastening member.

The fastening member may include a heat conductive material.

The connection portion may have an opening formed therein for connecting the heat dissipation member therethrough.

The barrier may include a metal, and a surface of the barrier may be anodized.

The barrier may include a plastic material.

Adjacent battery modules of the plurality of battery modules may be accommodated in the housing by being aligned so that side surfaces of outermost battery cells of the adjacent battery modules are opposite to each other.

The battery pack may further include another heat dissipation member, and the adjacent battery modules may be connected to each other via the heat dissipation member and the another heat dissipation member.

The battery pack may further include a connector connecting the heat dissipation member and the another heat dissipation member.

The connector may include a heat conductive material.

The connector may be configured as a metal rod or a metal mesh.

The heat conducting member may include an outer case, and a porous plate within the outer case, the porous plate having micro-pores.

The porous plate may include a metallic material sintered to form the micro-pores therein.

The heat conducting member may have a void inside the porous plate.

The battery pack may further include a coolant circulating in the heat conducting member and the housing.

The coolant may include at least one of a fluid or a gas.

The heat conducting member may include at least one through-hole portion.

The at least one through-hole portion may include first and second through-hole portions. The first through-hole portion may be an inlet through which the coolant for cooling the battery cells is flowed into the heat conducting member, and the second through-hole portion may be an outlet through which the coolant flowed through the first through-hole portion is discharged from the heat conducting member.

As described above, according to an aspect of embodiments of the present invention, a battery pack includes a heat dissipation member and a porous member, thereby improving heat dissipation characteristics using a coolant.

Accordingly, a battery pack according to embodiments of the present invention has an improved cooling efficiency, and a battery cell is not easily deteriorated even though it is charged and discharged a plurality of times.

BRIEF DESCRIPTION OF THE DRAWINGS

The accompanying drawings, together with the specification, illustrate some exemplary embodiments of the present invention, and, together with the description, serve to explain principles of the present invention.

DETAILED DESCRIPTION

In the following detailed description, some exemplary embodiments of the present invention have been shown and described by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Some exemplary embodiments of the present invention will now be described in detail with reference to the accompanying drawings.

Figure 1:
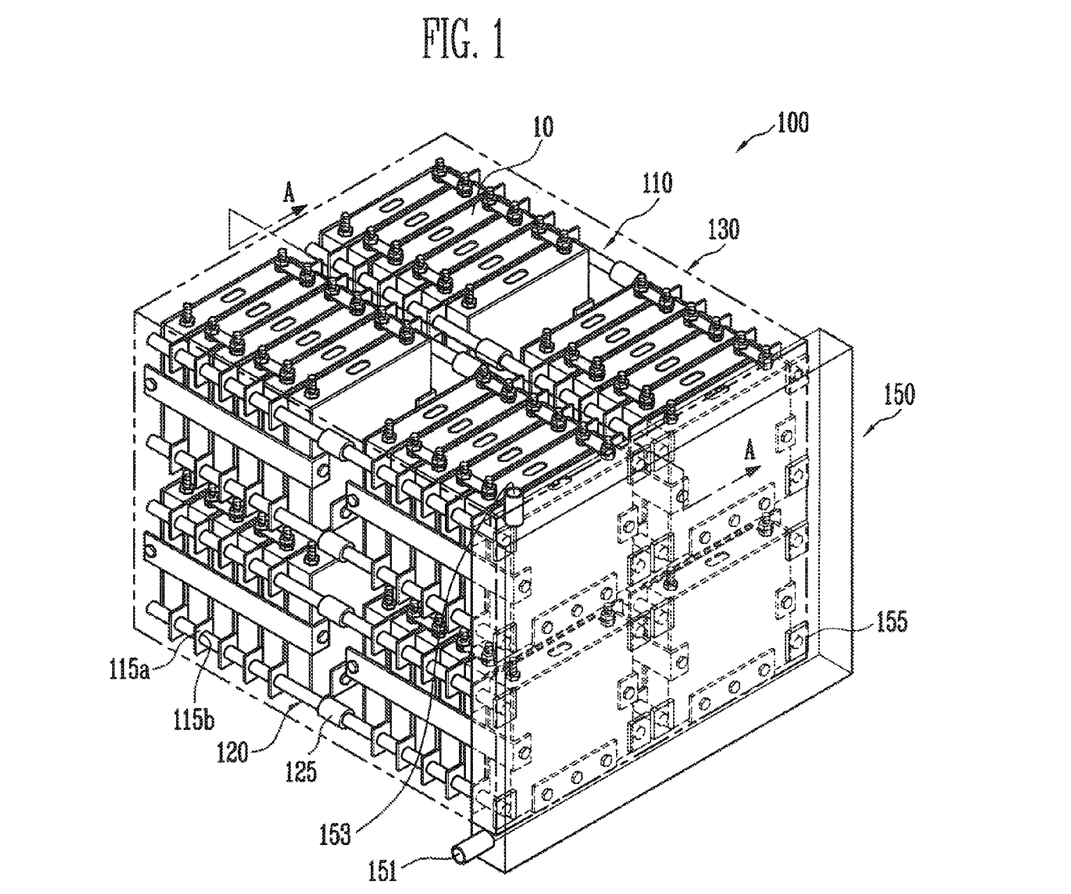
FIG. 1 is a schematic perspective view of a battery pack according to an embodiment of the present invention.
Figure 2:
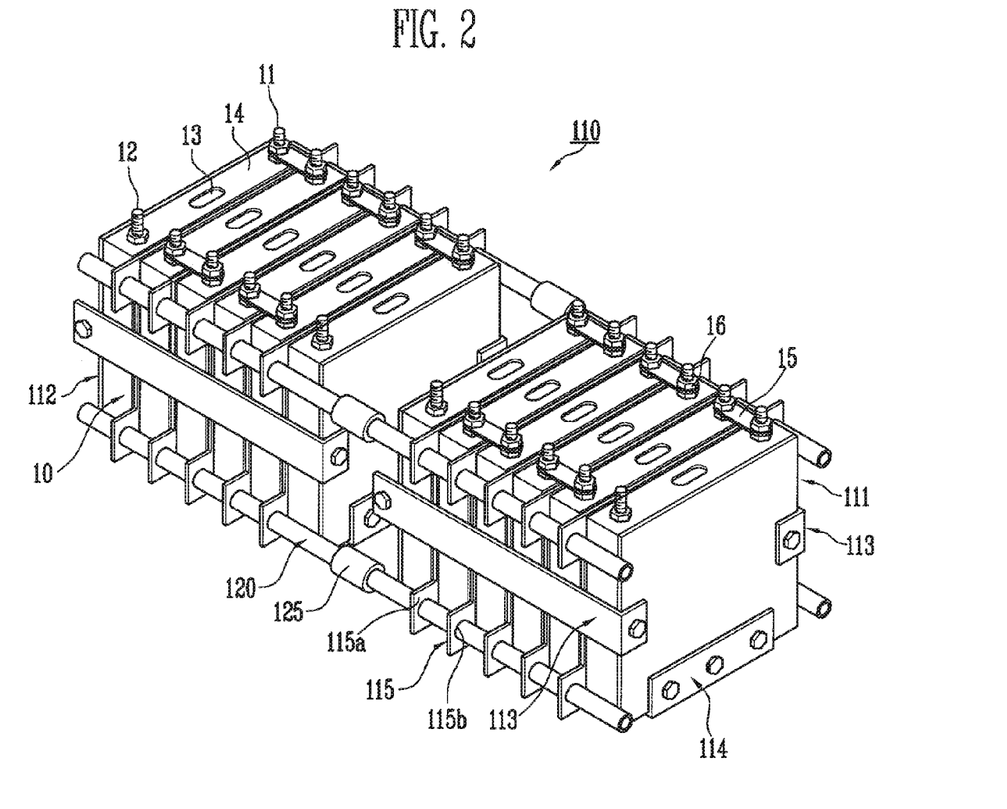
FIG. 2 is a perspective view of a battery module included in the battery pack of FIG. 1.
Figure 3:
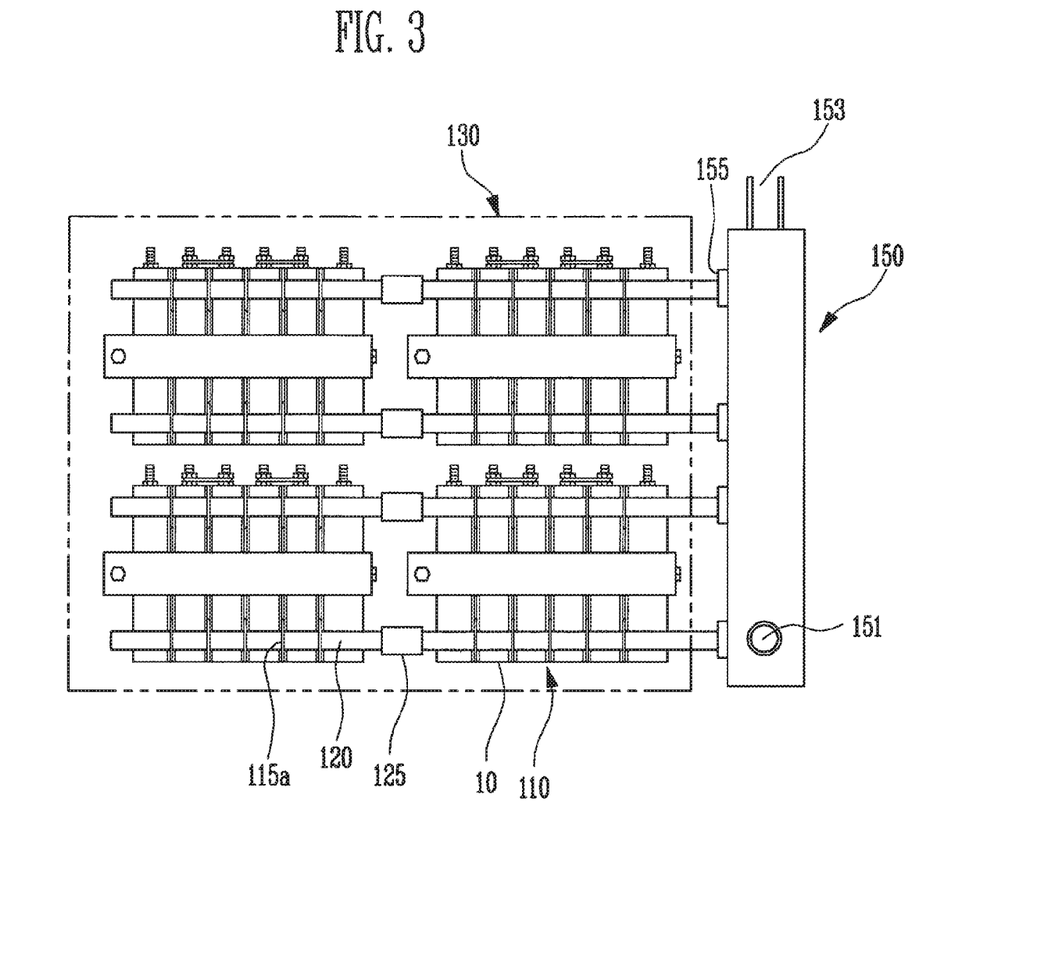
FIG. 3 is a sectional view of the battery pack of FIG. 1, taken along the line A-A.
Figure 4A:
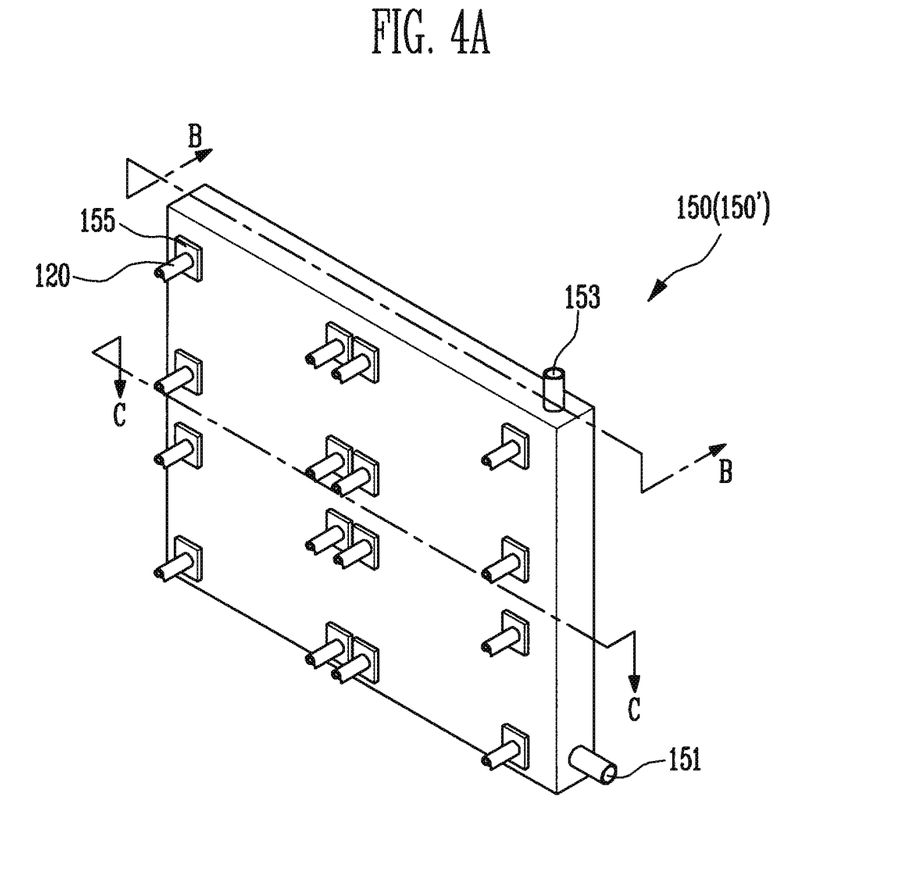
FIG. 4A is a schematic perspective view of a heat transfer member of a battery pack according to an embodiment of the present invention.
Figure 4B:
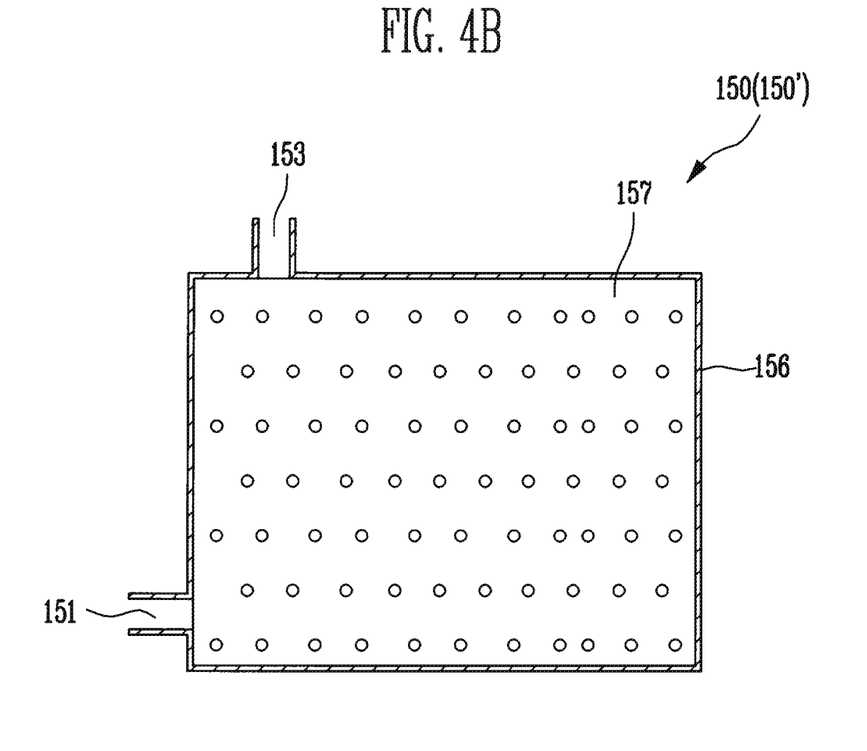
FIG. 4B is a sectional view of the heat transfer member of FIG. 4A, taken along the line B-B.
Figure 4C:
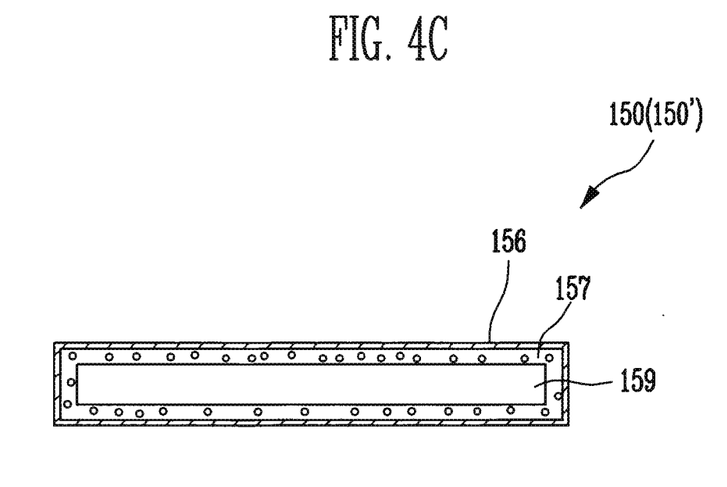
FIG. 4C is a sectional view of the heat transfer member of FIG. 4A, taken along the line C-C.

FIG. 1 is a schematic perspective view of a battery pack according to an embodiment of the present invention. FIG. 2 is a perspective view showing a battery module included in the battery pack of FIG. 1. FIG. 3 is a sectional view of the battery pack of FIG. 1, taken along the line A-A. FIG. 4A is a schematic perspective view of a heat transfer member of a battery pack according to an embodiment of the present invention. FIG. 4B is a sectional view of the heat transfer member of FIG. 4A, taken along the line B-B. FIG. 4C is a sectional view of the heat transfer member of FIG. 4A, taken along the line C-C.

Referring to FIGS. 1 and 2, a battery pack 100 according to an embodiment of the present invention includes one or more battery modules 110, each including a plurality of battery cells 10 aligned in one direction and a plurality of barriers 115 each being interposed between adjacent battery cells 10 of the plurality of battery cells 10 and having at least one connection portion 115a protruded to the outside of the battery cells 10. The battery pack 100 further includes one or more heat dissipation members 120 coupled to the connection portions 115a; a housing 130 that accommodates the battery modules 110 and the heat dissipation members 120; and a heat conducting member 150 provided at a predetermined position of the exterior of the housing 130 and connected to the heat dissipation members 120.

The housing 130 may accommodate one or more battery modules 110, and the battery modules 110 may be aligned so that side surfaces of adjacent battery cells 10 are opposite to each other.

The battery module 110 will be described in further detail with reference to FIG. 2. The battery module 110, in one embodiment, includes a plurality of the battery cells 10 aligned in one direction, and each of the battery cells 10 includes positive and negative electrode terminals 11 and 12. The battery cells 10 are aligned so that wide surfaces of adjacent battery cells 10 are opposite to each other.

Each of the battery cells 10 of the battery module 110 may be manufactured by housing an electrode assembly and an electrolyte in a battery case and then sealing the battery case in which the electrode assembly is accommodated using a cap plate 14. The electrode assembly may include a positive electrode plate, a negative electrode plate, and a separator interposed between the positive and negative electrode plates. The cap plate 14 may be provided in the state that the positive electrode terminal 11 connected to the positive electrode plate and the negative electrode terminal 12 connected to the negative electrode plate are protruded to the exterior thereof. In one embodiment, the positive and negative electrode plates generate electrochemical energy through a reaction between the electrolyte and the positive and negative electrode plates, and the generated energy is transferred to the exterior of the battery cell 10 through the positive and negative electrode terminals 11 and 12. A vent 13 may be provided on the cap plate 14 between the positive and negative electrode terminals 11 and 12 so as to serve as a path through which a gas is exhausted to the exterior of the battery cell 10.

In one embodiment, the battery cell 10 is a prismatic lithium ion secondary battery. However, the present invention is not limited thereto, and may be applied to various types of batteries such as a lithium polymer battery and a cylindrical battery.

The battery module 110 may include a plurality of battery cells 10, a pair of first and second end plates 111 and 112 spaced apart from each other, and connection members 113 and 114 that connect the first and second end plates 111 and 112 to each other.

The first and second end plates 111 and 112 are disposed to come in surface contact with the outermost battery cells 10, respectively, so as to apply pressure toward insides of the plurality of battery cells 10. The connection members 113 and 114 connect the first and second end plates 111 and 112 to each other. In one embodiment, first ends of the connection members 113 and 114 are fastened to the first end plate 111, and second ends of the connection members 113 and 114 opposite the first ends are fastened to the second end plate 112. In one embodiment, the first and second end plates 111 and 112 may be fastened to the connection members 113 and 114 by fastening members, such as bolts and nuts.

The connection members 113 and 114, in one embodiment, provide a space in which the plurality of battery cells 10 are aligned by connecting the first and second end plates 111 and 112 to each other, and also support both side surfaces and a bottom surface of each of the battery cells 10. Referring to FIG. 2, in one embodiment, the connection members 113 and 114 may include two side connection members 113 that respectively support both side surfaces of the battery cells 10 and one bottom connection member 114 that supports the bottom surfaces of the battery cells 10. However, the present invention is not limited thereto and, in other embodiments, the positions and shapes of the connection members 113 and 114 may be variously modified according to the design of the battery module 110.

The battery cells 10, in one embodiment, are fixed in the space defined by the first and second end plates 111 and 112, the side connection members 113, and the bottom connection member 114 so as not to be easily moved by an external force. In one embodiment, the positive and negative electrode terminals 11 and 12 of two adjacent battery cells 10 may be electrically connected to each other through a bus bar 15. The bus bar 15 may be provided with openings through which the positive and negative electrode terminals 11 and 12 can pass, respectively. The bus bar 15 to which the terminals are connected by passing through the openings may be fixed by fixing members, such as nuts 16.

The barrier 115 may be interposed between adjacent battery cells 10. A spacer (not shown) may be provided to the barrier 115. The barrier 115 allows the battery cells 10 to be spaced apart from each other and form a space between the battery cells 10, thereby providing a flow path of the coolant that cools the battery cells 10. The barrier 115 according to one embodiment includes the connection portion 115a protruded to the outside of the battery cell 10. A fastening hole 115b is formed in the connection portion 115a. The fastening hole 115b and the heat dissipation member 120 which will be described later are fastened and connected to each other.

Generally, the battery cell 10 may generate heat while charging and discharging the battery cell 10 a plurality of times. Since the generated heat increases the temperature of the battery cell 10, the performance of the battery cell 10 may be deteriorated, and there may be a problem in safety. In order to prevent or reduce such a problem caused by the generated heat, the heat dissipation member 120 according to the present invention is disposed to be connected to the battery module 110.

The heat dissipation member 120 according to an embodiment of the present invention has the shape of a heat dissipation pipe. The heat dissipation member 120 is fastened to the fastening hole 115b formed in the connection portion 115a to be connected to the barrier 115. The barrier 115, in one embodiment, may be made of a metallic or plastic material. In a case where the barrier 115 is made of a plastic material, in one embodiment, the fastening hole 115b and the heat dissipation member 120 may be fastened to each other using a forcible insertion method. In a case where the barrier 115 is made of a metallic material such as aluminum (Al), for example, a metal oxide film is formed on the surface of the metal by anodizing the surface of the metal for the purpose of insulation. Then, in one embodiment, the fastening hole 115b and the heat dissipation member 120 may be connected to each other using a compressing or soldering method. In a case where the barrier 115 is made of aluminum (Al), the surface of the aluminum is coated with nickel (Ni), and the fastening hole 115b and the heat dissipation member 120, in one embodiment, may then be connected to each other using the soldering method.

The battery modules 110 and the heat dissipation members 120, in one embodiment, are accommodated in the interior of the housing 130. In one embodiment, adjacent battery modules 110 are connected to each other through adjacent heat dissipation members 120, and a connector 125 may be interposed between the connected heat dissipation members 120. The connector 125 may be formed in the shape of a metal rod or metal mesh made of a metallic material, such as copper (Cu) or aluminum (Al), for example, which is a heat conductive material. In a case where the connector 125 is formed in the shape of a metal mesh, the metal mesh can absorb vibration between the adjacent battery modules 110, thereby enhancing vibration resistance.

Referring to FIG. 3, in one embodiment, the heat conducting member 150 connected to the heat dissipation member 120 is provided at an outside of the housing 130. The heat conducting member 150 discharges heat to the exterior of the battery pack 100 through a fastening member 155 which will be described later. The heat is generated from the battery cells 10 and discharged through the heat dissipation member 120. The heat dissipation member 120 and the fastening member 155, in one embodiment, are each made of a heat conductive material. A coolant that is a fluid or a gas for cooling the battery cells 10 is provided to the battery pack 100 including the battery modules 110. Here, the heat dissipation member 120 absorbs heat generated from the battery cells 10 in the battery module 110 by the medium of the coolant and discharges the absorbed heat to the exterior of the housing 130 of the battery pack 100 through the heat conducting member 150. That is, the coolant may flow through the heat dissipation member 120 for absorbing and discharging the heat generated from the battery cells 10.

The heat conducting member 150 will be described further with reference to FIGS. 4A to 4C. The heat conducting member 150 includes an outer case 156 and a porous plate 157 accommodated in the interior of the outer case 156. In one embodiment, the outer case 156 and the porous plate 157, which constitute the heat conducting member 150, are also made of a heat conductive material.

The heat conducting member 150, in one embodiment, may have a structure in which a void 159 is further provided in the interior of the porous plate 157. In one embodiment, where the void 159 is further provided in the interior of the porous plate 157 as described above, a coolant that circulates in the interior of the porous plate 157 can be more easily circulated through the void 159, and thus the cooling efficiency of the battery pack 100 can be further improved.

The porous plate 157, in one embodiment, may be formed of a metallic material having micro-pores formed therein, but the material of the porous plate 157 is not limited thereto. For example, the porous plate 157 may be formed of a sintered metallic material obtained by compressing a mixture of metal and binder and then sintering the mixture at a melting point of the binder, or more. In the sintered metallic material, micro-pores are formed at positions of the original binder.

According to one embodiment, a fastening member 155 is provided at one side of the heat conducting member 150. The heat conducting member 150 and the heat dissipation member 120 are connected to each other via the fastening member 155. In one embodiment, the fastening member 155 is made of a heat conductive material so that the heat discharged from the battery cells 10, the coolant, and the heat dissipation member 120 is conducted to the heat conducting member 150 and easily discharged to the exterior of the battery pack 100.

The heat conducting member 150 may be provided with first and second through-hole portions 151 and 153. In one embodiment, the first through-hole portion 151 may be an inlet through which the coolant for cooling the battery cells 10 is flowed into the heat conducting member 150, and the second through-hole portion 153 may be an outlet through which the coolant flowed through the first through-hole portion 151 is discharged from the heat conducting member 150. That is, in one embodiment, the coolant is flowed into the heat conducting member 150 through the first through-hole portion 151, and cools the battery modules 110 while circulating in the interior of the housing 130 (i.e. through the heat dissipation members 120). Then, the coolant is discharged from the heat conducting member 150 through the second through-hole portion 153.

The first through-hole portion 151 is a portion through which the coolant is flowed into the heat conducting member 150. The temperature of the coolant flowed in the battery pack 100 is lowest at this portion. The second through-hole portion 153 is a portion through which the coolant having a temperature that is increased through a heat exchange with the battery pack 100 is discharged from the heat conducting member 150.

Hereinafter, a battery pack according to another embodiment of the present invention will be described with reference to FIGS. 5 and 6.

Figure 5:
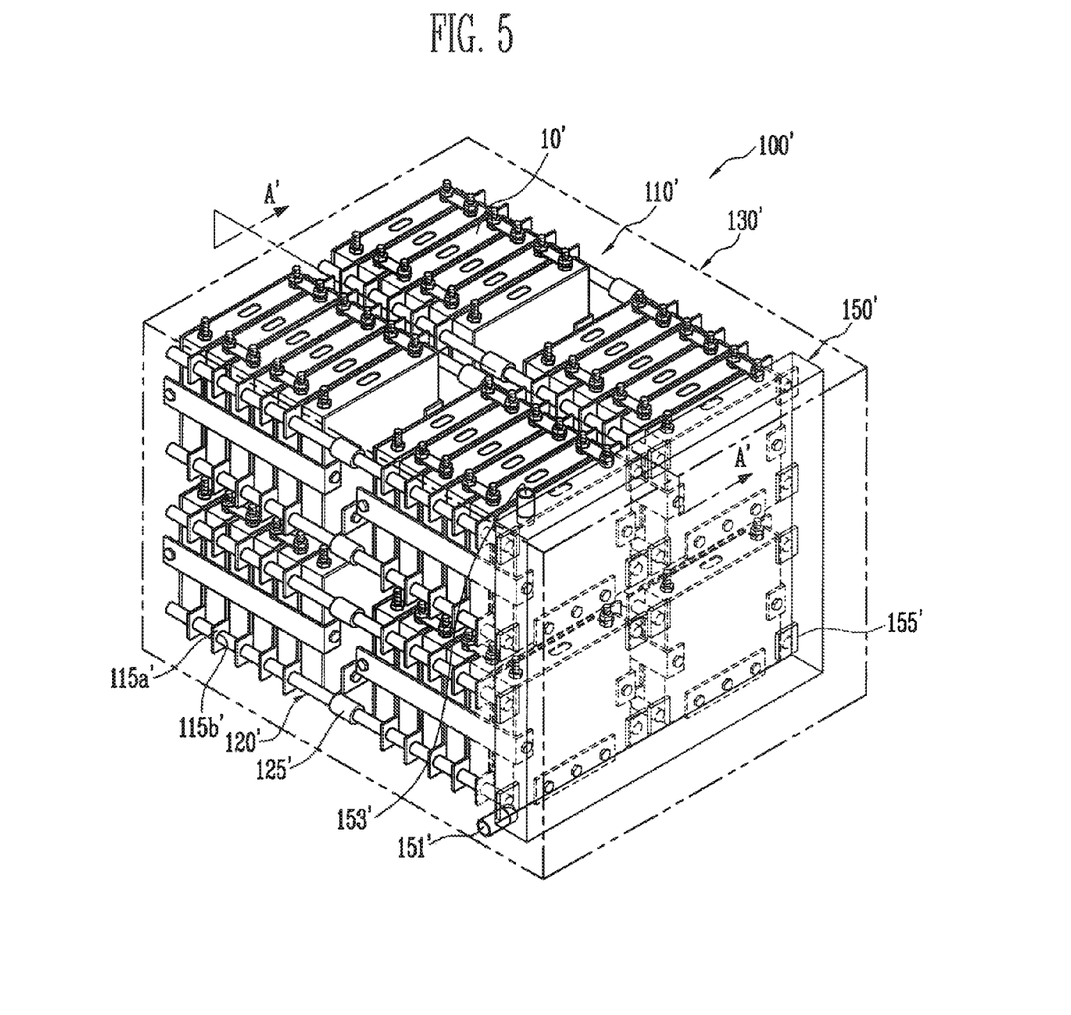
FIG. 5 is a schematic perspective view of a battery pack according to another embodiment of the present invention.

FIG. 5 is a schematic perspective view of a battery pack according to another embodiment of the present invention. FIG. 6 is a sectional view of the battery pack of FIG. 5, taken along the line A'A'.

A battery pack 100' according to another embodiment of the present invention is different from the battery pack 100 described above in the position at which a heat conducting member 150' is disposed. Hereinafter, differences in the battery pack 100' with respect to the battery pack 100 will be described, and further description of same components or features will be omitted.

Figure 6:
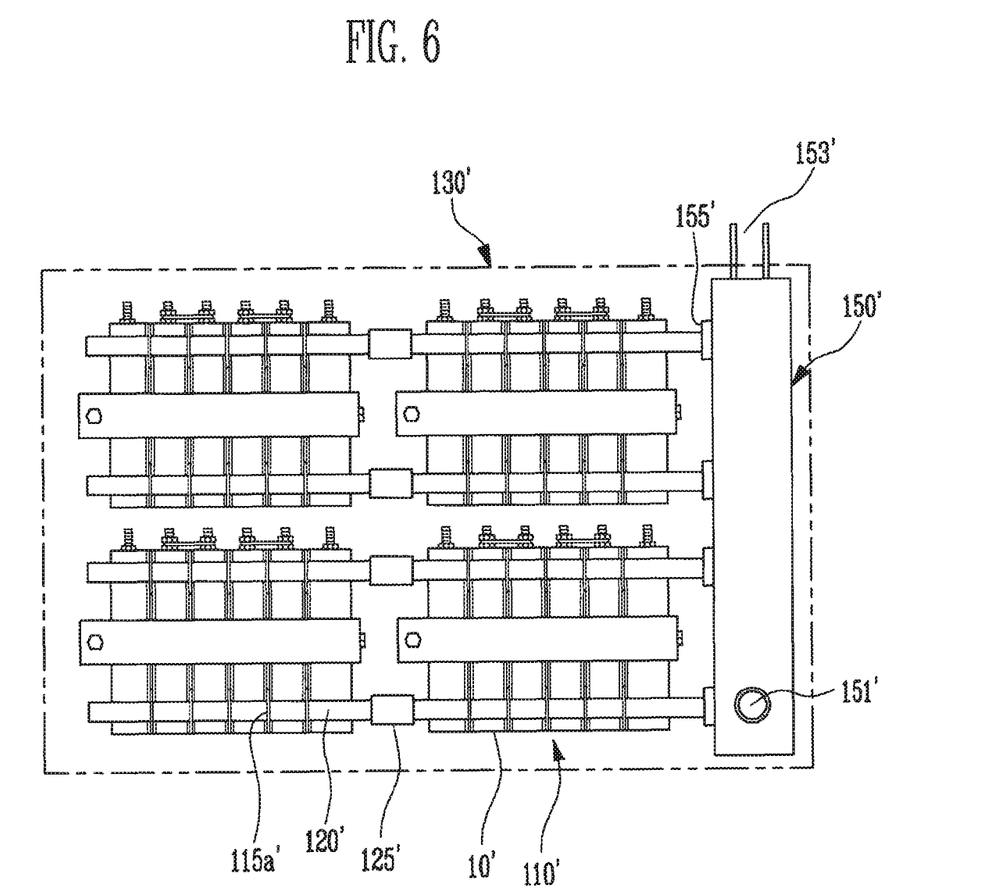
FIG. 6 is a sectional view of the battery pack of FIG. 5, taken along the line A'-A'.

Referring to FIGS. 5 and 6, the battery pack 100' according to one embodiment of the present invention includes battery modules 110' each including a plurality of battery cells 10' aligned in one direction and a plurality of barriers 115' each interposed between adjacent battery cells 10' of the plurality of battery cells 10' and having at least one connection portion 115a' protruded to the outside of the battery cells 10'. The battery pack 100' further includes one or more heat dissipation members 120' connected to the connection portions 115a' at openings 115b'; a housing 130' that accommodates the battery modules 110' and the heat dissipation members 120'; and a heat conducting member 150' provided at a predetermined position of the interior of the housing 130' and connected to the heat dissipation members 120'. The heat dissipation members 120' may be connected together through a connector 125' similar to the connector 125 described above.

The battery module 110' accommodated in the housing 130' may be the same or substantially the same as the battery module 110 described above, and therefore, further description thereof will be omitted.

In the battery pack 100 described above, the heat conducting member 150 connected to the heat dissipation member 120 is disposed outside of the housing 130. However, in the battery pack 100' according to the embodiment shown in FIGS. 5 and 6, the heat conducting member 150' is disposed inside of the housing 130'. In one embodiment, heat that is generated from the battery cells 10' and discharged through the heat dissipation member 120' is conducted to the heat conducting member 150' through a fastening member 155' and then is discharged to the exterior of the housing 130' of the battery pack 100'.

Similar to the battery pack 100 described above, in the battery pack 100' a coolant that is a fluid or a gas for cooling the battery cells 10' is provided to the battery pack 100' including the battery modules 110'. Unlike the battery pack 100 described above, the battery pack 100' according to the embodiment of FIGS. 5 and 6 is provided with the housing 130' having the heat conducting member 150' in the interior thereof (e.g., integrally formed in the interior thereof). Thus, the battery pack 100' may be small and integrated.

The heat conducting member 150' according to an embodiment of the present invention is the same or substantially the same as the heat conducting member 150 described above and shown in FIGS. 4A to 4C. For example, the heat conducting member 150' may include first and second through-hole portions 151' and 153' similar to the first and second through-hole portions 151 and 153 described above with respect to the heat conducting member 150.

The battery pack according to embodiments of the present invention includes a heat dissipation member and a porous member for improving heat dissipation characteristics using a coolant.

Accordingly, a battery pack according to embodiments of the present invention has an improved cooling efficiency, and a battery cell is not easily deteriorated even though it is charged and discharged a plurality of times.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
 a plurality of battery modules, each comprising:
  a plurality of battery cells aligned in a direction; and
  a plurality of barriers, each being between a respective pair of adjacent battery cells of the plurality of battery cells and comprising a connection portion protruded to the outside of the adjacent battery cells, a single battery cell of the plurality of battery cells being between a pair of adjacent barriers of the plurality of barriers;
 a plurality of heat dissipation members connected to connection portions of barriers of the plurality of barriers of respective ones of the plurality of battery modules, each of the plurality of heat dissipation members configured to pass a coolant therethrough; and
 a heat conducting member connected to each of the plurality of heat dissipation members at a respective fastening member,
 wherein each of the connection portions has an opening formed therein, and each of the plurality of heat dissipation members passes through the openings of the plurality of barriers of the respective battery module.

2. The battery pack according to claim 1, further comprising a housing accommodating the battery modules and the heat dissipation members.

3. The battery pack according to claim 2, further comprising a coolant circulating in the heat conducting member and the housing, wherein the coolant comprises at least one of a fluid or a gas.

4. The battery pack according to claim 2, wherein the heat conducting member is inside or outside of the housing.

5. The battery pack according to claim 2, wherein adjacent battery modules of the plurality of battery modules are accommodated in the housing by being aligned so that side surfaces of outermost battery cells of the adjacent battery modules are opposite to each other.

6. The battery pack according to claim 5, further comprising another heat dissipation member, wherein the adjacent battery modules are connected to each other via a respective heat dissipation member of the plurality of heat dissipation members and the another heat dissipation member.

7. The battery pack according to claim 6, further comprising a connector connecting the respective heat dissipation member and the another heat dissipation member.

8. The battery pack according to claim 7, wherein the connector comprises heat conductive material.

9. The battery pack according to claim 7, wherein the connector is configured as a metal rod or a metal mesh.

10. The battery pack according to claim 1, wherein the fastening member comprises a heat conductive material.

11. The battery pack according to claim 1, wherein the barrier comprises a metal, and a surface of the barrier is anodized.

12. The battery pack according to claim 1, wherein the barrier comprises a plastic material.

13. The battery pack according to claim 1, wherein the heat conducting member comprises an outer case, and a porous plate within the outer case, the porous plate having micro-pores.

14. The battery pack according to claim 13, wherein the porous plate comprises a metallic material sintered to form the micro-pores therein.

15. The battery pack according to claim 13, wherein the heat conducting member has a void inside the porous plate.

16. The battery pack according to claim 1, wherein the heat conducting member comprises at least one through-bole portion.

17. The battery pack according to claim 16, wherein the at least one through-hole portion comprises first and second through-hole portions, the first through-hole portion being an inlet through which a coolant for cooling the battery cells is flowed into the heat conducting member, and the second through-hole portion being an outlet through which the coolant flowed through the first through-hole portion is discharged from the heat conducting member.

* * * * *